Nov. 15, 1955  S. STARK ET AL  2,723,528
AUXILIARY POWER PACKAGE
Filed June 30, 1951  2 Sheets-Sheet 1
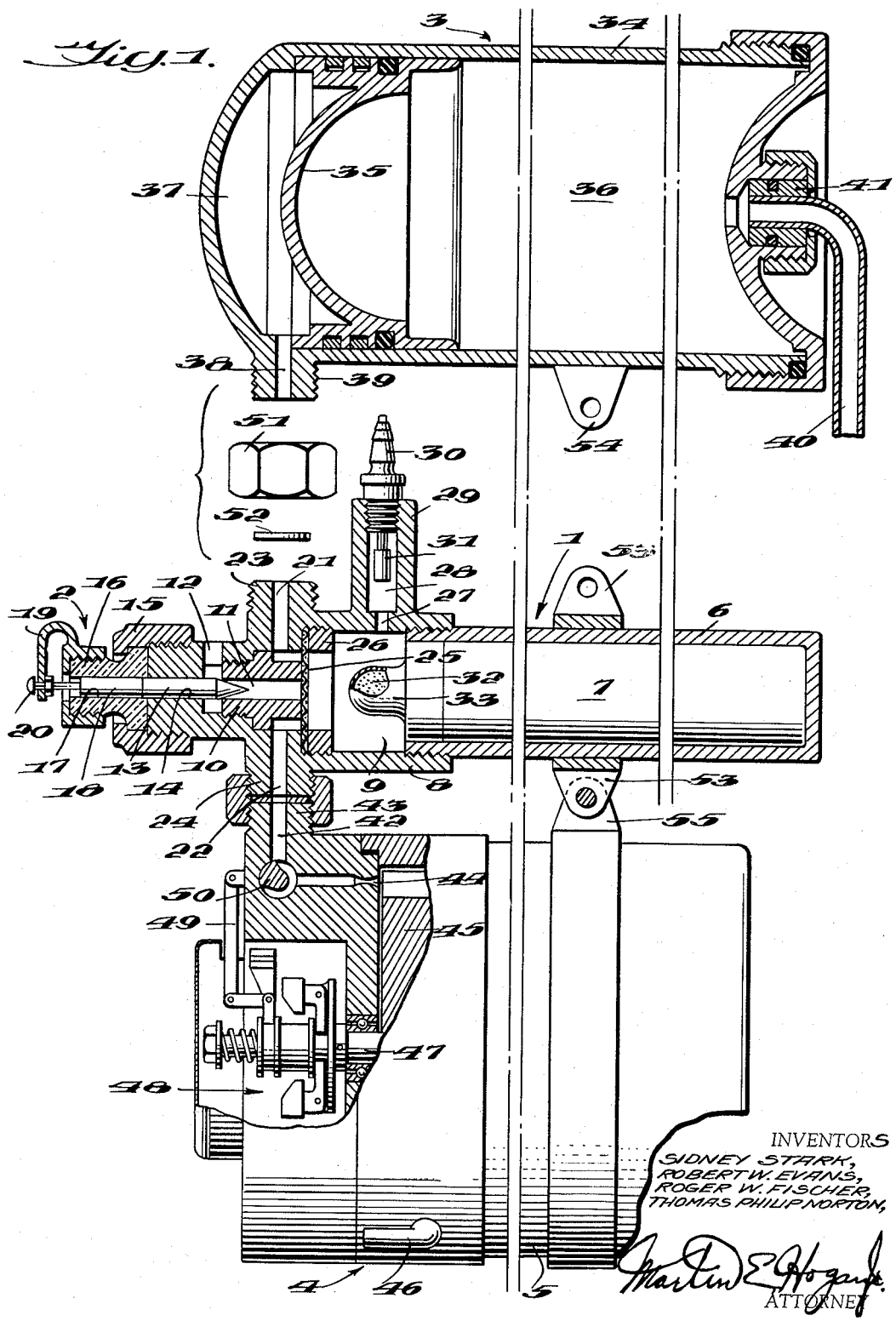
INVENTORS
SIDNEY STARK,
ROBERT W. EVANS,
ROGER W. FISCHER,
THOMAS PHILIP NORTON,
ATTORNEY Nov. 15, 1955   S. STARK ET AL   2,723,528
AUXILIARY POWER PACKAGE
Filed June 30, 1951   2 Sheets-Sheet 2
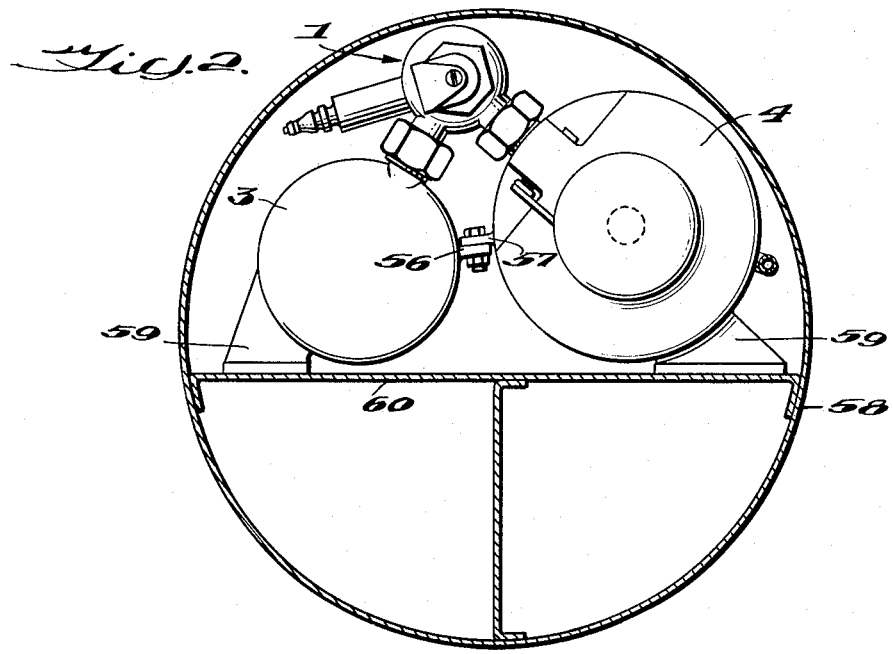
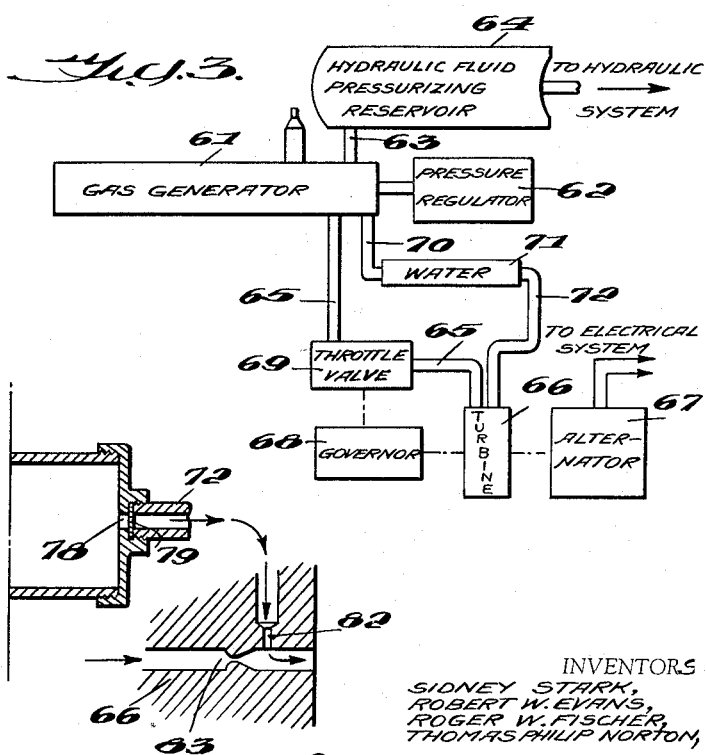
INVENTORS
SIDNEY STARK,
ROBERT W. EVANS,
ROGER W. FISCHER,
THOMAS PHILIP NORTON,
BY Martin E. Hogan Jr.
ATTORNEY United States Patent Office 2,723,528
Patented Nov. 15, 1955

2,723,528

AUXILIARY POWER PACKAGE

Sidney Stark, Robert W. Evans, Roger W. Fischer, and Thomas Philip Norton, Baltimore County, Md., assignors to The Glenn L. Martin Company, Middle River, Md., a corporation of Maryland Application June 30, 1951, Serial No. 234,606

2 Claims. (Cl. 60—39.1)

This application relates to an improved power package especially adapted for use to furnish both hydraulic and electrical power for a relatively limited period of time.

In conjunction with guided missiles of the air-to-air type, it is necessary to provide both hydraulic and electrical power for controlling and actuating the aerodynamic control surfaces of the missile, as well as for the guidance system. Such missiles have a relatively short duration of flight, but, during this flight, they are frequently required to perform relatively violent maneuvers in order to intercept an enemy aircraft. The missiles themselves are ordinarily of relatively small size compared to a conventional aircraft and the problem of providing a suitable source of power within the permissible weight limitations is a serious one. The propelling means is usually a reaction motor and it is not normally feasible to bleed off the necessary power and convert it into the required hydraulic and electrical power. The use of pressurized storage tanks for delivering the required amount of hydraulic fluid for actuating the servomotors, or the use of batteries of sufficient capacity to furnish the required amount of electrical energy involves a weight penalty which cannot be tolerated.

It is therefore an object of this invention to provide a relatively small and light auxiliary power unit which is capable of furnishing both the hydraulic and electrical power required for such a missile.

It is a further object to provide such a power unit wherein a solid propellant charge of the type commonly used for rocket propulsion is caused to generate gases under a relatively high regulated pressure, the gases being used to pressurize a hydraulic reservoir and to drive a suitable turbine which in turn drives an alternator for generating the required electrical energy.

A further object is to provide such a power package which may be stored for a considerable period of time without appreciable loss of effectiveness and yet which upon ignition will very quickly meet the maximum power demand of the missile.

Still another object is to produce a gas generator wherein the pressure of the gases of combustion may be closely and positively controlled.

Further and other objects will become apparent from the following description and claims especially when taken in view of the appended drawings.

In the drawing:

Figure 1 is a fragmentary, somewhat diagrammatic showing of the power package of this invention.

Figure 2 is a transverse sectional view taken through the fuselage of a missile and showing the power package mounted therein.

Figure 3 is a diagrammatic showing of a slightly modified power package.

Figure 4 is a diagrammatic showing of the water injecting means used in the Figure 3 embodiment.

As shown in Figure 1, the power package consists essentially of a gas generator 1 including a pressure regulator 2, a hydraulic fluid pressurizing unit 3 and a turbine 4 both of the latter being connected directly to and actuated by the gas generator, and the turbine driving a suitable alternator 5.

The gas generator includes an elongated cylindrical body 6 of such a diameter as to closely receive a charge of solid propellant 7. Solid propellant 7 is of the type commonly employed in rocket or reaction motors such as are used for assisting the take-off of airplanes, and, when ignited at one end, will burn at a relatively rapid and substantially constant rate until completely consumed. The time of burning depends primarily on the length of the charge, while the rate of energy release (in the form of hot, gaseous products of combustion) is substantially proportional to the cross sectional area of the charge. The body 6 is rigidly connected at its open end to a housing 8 which includes a combustion chamber 9 adjacent the end of the solid propellant 7. Carried essentially within the housing 8 is a removable valve seat 10 having a bore 11 extending axially therethrough into communication with a suitable exhaust port 12. The outer end wall of the housing 8 is provided with a bore 14 aligned with the bore 11 and adapted to slidably receive a valve pintle 13 which is adapted to seat against the valve seat 10 to control the escape of gases therethrough. Secured to the outer end of the housing 8, as by a threaded sleeve 15 is a cap 16 of heat insulating material, the cap likewise having a bore 17 extending therethrough co-axial with and of the same diameter as bore 14. Suitably secured to the outer end of cap 16 is a spring 19 arranged as clearly shown in Figure 1 so that the end thereof overhangs the bore 17. A suitable adjusting screw 20 is carried by the overhanging end of spring 19 and is adapted to seat against a heat insulating slidable plug 18. As is clear from Figure 1, tension of the spring 19 is applied through the screw 20 and plug 18 to the valve pintle 13 so as to hold the latter against seat 10 with a predetermined force. A pair of outlet ports 21 and 22 extend from the combustion chamber 9 outwardly through the threaded bosses 23 and 24 for conducting gases to the hydraulic fluid pressurizing unit 30 and the turbine 4, respectively. If desired, a suitable screen of heat resistant material such as tungsten may be interposed between the combustion chamber and the outlet and regulator ports 21, 22 and 11 so as to prevent particles of the propellant from adversely affecting the operation of the regulator, turbine or pressurizing unit. Screen 25 may be secured in place as by a threaded ring 26.

Also communicating with the combustion chamber 9 as by a port 27 is an ignition chamber 28 formed within boss 29 projecting laterally from the housing 8. A small spark plug 30 is threaded into the open end of boss 29 and carries an explosive squib 31 for initiating the burning of the propellant 7. In order to insure that the propellant will be ignited, a small charge of igniting powder 32 is secured against the end of the charge 7 as by an inflammable sack 33 slipped over the end of the propellant 7. As shown in Figure 2, bosses 23, 24 and 29 actually lie in different radial planes but, to facilitate the disclosure, they are shown in Figure 1 as if they were rotated around into a common plane.

The hydraulic fluid pressurizing unit 3 comprises a generally cylindrical tank 34 having a piston 35 slidable axially therein and dividing the cylinder into a fluid storage chamber 36 and a pressurizing chamber 37. The hot gases from the gas generator are admitted to the pressurizing chamber 37 by means of an inlet port 38 extending through the threaded boss 39 adjacent the end thereof. The gas under pressure in chamber 37 will thereby act through the piston 35 to place the fluid in chamber 36 under corresponding pressure and cause the discharge thereof, as dictated by the demands of the hydraulic control system, through the conduit 40 swivelly connected to the end of the pressurizing unit as at 41.

The turbine 4 and alternator 5 are so constructed as to form a single compact unit, also generally cylindrical in outside contour. Gas under pressure is supplied to the turbine by means of an inlet passage 42 extending from the boss 43 to the usual nozzle or nozzles 44 of the turbine adjacent the turbine rotor 45. The expanded gases are discharged from the turbine as by one or more exhaust ports 46.

No details of the alternator are shown since any known type of generator or alternator may obviously be employed, the chief requirement being that the alternator be capable of furnishing the various voltages and amperages required by the associated electrical equipment. In the instant application of the power package the load upon the alternator will fluctuate quite widely throughout the period of operation, depending upon the amount and frequency of control action required to direct the missile along its desired course. Therefore it is desirable, in order to hold the frequency of the alternator at a substantially constant value, to provide means for maintaining the rate of rotation of the turbine at a constant value. Any suitable governor mechanism may be employed for this purpose. As shown in Figure 1 the governor mechanism 48 is of the conventional fly ball type and is mounted directly upon the end of the turbine shaft 47. The governor is connected by means of a suitable linkage 49 to a throttle valve 50 interposed within the passage 42, the arrangement being such that if the turbine tends to overspeed, the inlet passage will be restricted so as to decrease the amount of gas which is permitted to impinge against the rotor blades and thus to restore the rate of rotation to the desired value.

As shown in Figures 1 and 2, the three main elements of the power package are rigidly assembled together in an extremely compact manner. Bosses 23 and 39 are oppositely threaded and a turnbuckle type of nut 51 is used to secure these bosses together. A suitable washer 52 of soft metal is adapted to be interposed between the ends of the bosses so as to insure a fluid-tight connection. A similar turnbuckle type of connection is used between bosses 24 and 43 to connect the turbine to the gas generator. Spaced axially from the bosses are a pair of lugs 53 carried by the gas generator which are adapted to be bolted to mating lugs 54 and 55 carried by the fluid pressurizing unit and the alternator housing respectively. Also, as best shown in Figure 2, axially spaced lugs 56 on the fluid pressurizing unit are adapted to be bolted to corresponding lugs 57 on the alternator and turbine unit so as to securely fasten these units together. The assembly is adapted to be mounted within the fuselage 58 of a missile as by means of suitable brackets 59 secured to a cross plate 60 forming an integral part of the fuselage structure.

Since the gases being used to actuate the turbine will be at extremely high temperature, the turbine blades will tend to heat up to a dangerously high value if the power unit is maintained in operation for more than a relatively short length of time. The instant device is intended to operate for approximately 25 seconds and, despite the high temperatures involved, the mass of metal within the turbine has been found to be sufficient to slow down the rate of temperature rise to such an extent that the temperatures will not reach a dangerous value before the termination of the operation. However, if the device is to be operated for a longer period of time, as could be readily done by providing a longer propellant housing 6 and charge 7, means would probably be required to cool the gases somewhat before they reach the turbine. An arrangement for doing this is shown diagrammatically in Figure 3. Such a system might likewise be found necessary where a turbine wheel of relatively small mass was used.

Like the form already described, it includes a gas generator 61, pressure regulator 62, pressurizing unit 64, turbine 66 and alternator 67. The pressurizing unit 64 is connected to the gas generator as by conduit 63 and the turbine is connected to the gas generator by a conduit 65 having a throttle valve 69 interposed therein and adapted to be actuated by a governor 68 for the same purpose and in the same general manner as previously set forth. This modification differs from that previously described in that provision is made for injecting a cooling fluid such as water into the gases used for operating the turbine so as to lower their temperature sufficiently as to prevent undue heating of the turbine blades. To accomplish this result, gas is conducted as by a conduit 70 from the gas generator to a second pressurizing reservoir 71, initially filled with water and arranged to force the water at a predetermined rate through the line 72 and into the gas stream adjacent the turbine nozzles.

As shown somewhat diagrammatically in Figure 4, reservoir 71 comprises a generally cylindrical body, divided by a movable piston 73 into a pressurizing chamber 74 and a water storage chamber 75. Hot gases from the line 70 are admitted to the pressurizing chamber through inlet port 76, initially closed by a thin rupture diaphragm 77. The outlet line 72 communicates with the storage chamber 75 by means of an outlet port 78 also initially closed by a thin rupture diaphragm 79.

An orifice 80 of restricted size is interposed in the inlet line and an exhaust port 81 is provided in the side wall of the body adjacent the inlet end and initially closed by the piston.

As diagrammatically indicated in Figure 4, the outlet line 72 communicates with an injection nozzle 82 located just to the low pressure side of the turbine nozzle 83. Thus the water injected through nozzle 82 will mix with the hot gases flowing through the nozzle 83 to bring the temperature thereof down to a safe temperature. When the gas generator 61 is ignited, it will pressurize the hydraulic unit 64 and supply hot gases to the turbine 66 just as in the previously described embodiment. At the same time it will also supply hot gases to the water reservoir 71 which will first cause the bursting of diaphragm 77 and then will build up pressure in chamber 74 to cause piston 73 to produce corresponding pressure in chamber 75 to burst diaphragm 79. Water will immediately begin to flow into line 72 and thence to the injection nozzle 82. Piston 73 will of course move to the right as the water is forced from chamber 75 and will, in its initial movement, uncover exhaust port 81. The gases will then flow through orifice 80 into the chamber 74 and out through port 81. The relative sizes of orifice 80 and port 81 are such that the resulting pressure within chamber 74 (and hence that applied to the water) will be only about 50 lbs. per sq. in. This is desirable in view of the fact that the turbine gas pressure at the point of injection of the water is substantially at atmospheric pressure.

The operation of either embodiment is thought to be clear from the preceding description. At, or shortly before, the time of release of the missile from its mother craft, voltage will be applied to spark plug 30 to fire the squib 31. The flash from the squib 31 will in turn ignite the powder 32 in the inflammable sack 33 and this powder in turn will ignite the end of the propellant charge 7. Due to the relatively restricted volume of the combustion chamber 9, the pressurizing chamber 37, and the inlet passage 42 to the turbine, the pressure will rapidly build up to the desired value. Adjusting screw 20 will have previously been set so as to place the spring 19 under tension equal to that required to maintain the pintle 13 against its seat 10 until the pressure within the chamber reaches the desired value, say 2000 pounds per sq. in. The cross sectional area of the propellant 7 is of such size as to provide for the generation of gases at a rate at least equal to the maximum combined rate at which energy is to be taken from the hydraulic system and from the electrical system. Such solid propellant when ignited at one end has the characteristic of burning at a substantially constant, predetermined rate and therefore the size of the cylinder 6 and of the charge 7 can readily be ascertained for any particular unit. If the load or demand upon either or both the electrical or hydraulic system decreases below the design maximum, the pressure within the chamber would normally tend to build up to a high value. However, this is prevented in the instant case by the regulator valve 2 since any pressure in excess of the predetermined value will cause the pintle 13 to move axially away from the seat 10 and permit the exhaust of the excess gas through the exhaust port 12. The valve spring 19, being thermally isolated from the housing 8 and from the pintle 13 by means of the cap 16 of heat insulating material and the plug 18, also of insulating material, is unaffected by the high temperatures involved and its tension will therefore remain substantially constant throughout the burning time. While other materials could obviously be employed for this purpose, applicants have found that melamine is especially effective for these insulators.

Continuing with the operation, the gases at the controlled pressure will enter the chamber 37 to cause a corresponding pressurization of the hydraulic fluid within the chamber 36 and to supply the latter to the hydraulic system as it is demanded. Similarly, the gases will be applied through the passages 22 and 42 to the turbine nozzles 44 to cause the turbine to rotate so as to drive the alternator, the latter generating the desired voltages. As previously mentioned, the speed of rotation of the turbine and alternator will be maintained substantially constant by the action of the governor mechanism 48 despite load variations thereon.

It should be noted that the conical tip of the pintle 13 of the regulator valve is shown as being relatively sharply pointed. This is necessary in order to prevent undue heating of the pintle. Particularly when the valve is in open position the gases escaping through port 12 impinge against the tip of the pintle 13 with extremely high velocity and, of course, they are at very high temperatures. Unless the tip of the pintle is made extremely sharp, the pintle will be heated to such a point as to cause either binding within the housing or as to prevent proper seating of the valve when the pressure again drops off within the chamber 9.

While but two forms of the invention have been described, it is believed obvious that many changes are possible without departing from the spirit and scope of the invention as defined by the appended claims. For example, depending upon the type of propellant charge 7 employed, the screen 25 may be omitted without adversely affecting the operation of the unit. Similarly, other types of governor mechanism may be employed for maintaining the speed of rotation of the turbine and alternator substantially constant and other types of fluid pressurizing reservoirs could be employed without involving a departure from the teachings of this disclosure. However, for the illustrated application, the arrangement shown in Figures 1 and 2 is found to be most satisfactory both from the standpoint of its performance and from the standpoint of lightness and compactness.

We claim as our invention:

1. A power unit comprising an elongated hollow container closed at one end and provided with an exhaust port at the other end, a charge of solid propellant fuel substantially filling said container, said propellant being spaced slightly from the ported end of said container to provide a combustion chamber of relatively restricted size, means for igniting the end of said propellant adjacent the combustion chamber whereby to produce gaseous products of combustion therein, a pressure relief valve interposed between said combustion chamber and said exhaust port for maintaining the pressure of said gases substantially constant throughout the time of burning of said propellant and comprising a valve member movably carried by said container for controlling the escape of said gases through said exhaust port, a spring, a first heat insulator supporting said spring from said container and thermally isolating it therefrom and a second heat insulator interposed between said spring and said movable valve member for transmitting the force of said spring to said valve member so as to urge it into position blocking the flow of gases through said port, and means communicating with said combustion chamber for extracting work energy from said pressurized products of combustion.

2. A power unit comprising an elongated hollow container closed at one end and provided with an exhaust port at the other end, a charge of solid propellant fuel substantially filling said container, said propellant being spaced slightly from the ported end of said container to provide a combustion chamber of relatively restricted size, means for igniting the end of said propellant adjacent the combustion chamber whereby to produce gaseous products of combustion therein, and a pressure relief valve interposed between said combustion chamber and said exhaust port for maintaining the pressure of said gases substantially constant throughout the time of burning of said propellant and means communicating with said combustion chamber for extracting work energy from said pressurized products of combustion, spring means for regulating the pressure at which said valve will open, and heat insulating means interposed between and thermally isolating said spring means from both said valve and the remainder of said unit whereby to prevent the high temperatures of said gases and unit from adversely affecting the tension of said spring means.

References Cited in the file of this patent

UNITED STATES PATENTS

| | | |
|---|---|---|
| 1,419,267 | Kasley | June 13, 1922 |
| 1,423,330 | Kasley | July 18, 1922 |
| 1,593,768 | Kasley | July 27, 1926 |
| 2,104,914 | Temple | Jan. 11, 1938 |
| 2,263,705 | Seippel | Nov. 25, 1941 |
| 2,432,177 | Sédille | Dec. 9, 1947 |
| 2,476,857 | Grafinger | July 19, 1949 |
| 2,609,661 | Nardone | Sept. 9, 1952 |
| 2,620,627 | Nardone | Dec. 9, 1952 |
| 2,652,781 | Deardorff et al. | Sept. 22, 1953 |

FOREIGN PATENTS

| | | |
|---|---|---|
| 574,766 | Germany | May 4, 1933 |
| 660,503 | Germany | May 27, 1938 |
| 545,048 | Great Britain | May 8, 1942 |
| 548,727 | Great Britain | Oct. 22, 1942 |